United States Patent Office 2,877,123
Patented Mar. 10, 1959

2,877,123
SYNTHETIC MIXED DIBASIC ACID ESTER WAX MATERIAL

Alfred E. Rheineck, Minneapolis, and Lois A. Oberg, St. Louis Park, Minn., assignors to Archer-Daniels-Midland Company, Minneapolis, Minn., a corporation of Delaware No Drawing. Application June 5, 1957
Serial No. 663,592

8 Claims. (Cl. 106—10)

This invention and improvement relates to new synthetic wax-like materials. More particularly the improvement relates preferably to hard wax products and liquid to waxy additives of proportionately mixed saturated straight chain and saturated branched chain dibasic acid esters, each containing a total of from sixteen to sixty-four carbon atoms with preferably 18 to 20 carbon atoms in each acid radical of which from 1 to 8 carbon atoms can be a branch chain, and from 8 to 22 carbon atoms in the alcohol radicals.

The combination of starting compounds useful in this mixture have the general formulae:

$$R_1OOCXCOOR_2$$
and
$$R_1OOCYCOOR_2$$

where $R_1$ and $R_2$ are methyl to hexyl, either as mixed or single esters; X is a straight chain unsaturated aliphatic group with from 6 to 20 carbon atoms, and Y is a branched chain unsaturated aliphatic group with from 6 to 20 carbon atoms and from 1 to 8 carbon atoms in the branch group. In Y, unsaturation may be in either one or several parts of the branched chain. The final products have the general formulae:

$$R_3OOCX_1COOR_4$$
and
$$R_3OOCY_1COOR_4$$

where $X_1$ and $Y_1$ are saturated straight and saturated branched chain aliphatic groups, as above indicated for X and Y respectively, and $R_3$ and $R_4$ are straight or branched chain alkyl groups of 8 to 22 carbon atoms and either as mixed or single alcohol radicals of the esters.

Typical unsaturated dibasic acid esters as utilized herein, to obtain the products defined, may be dimethyl ester of octadecadiene-7,11 dicarboxylic acid-1,18; dimethyl ester of 7-vinyl-hexadecene-9-dicarboxylic acid-1,16; dimethyl ester of the $C_{20}$-diethylenic dicarboxylic acids; dimethyl ester hexadecadiene-6,10-dicarboxylic acid-1,16; dimethyl ester of 6-vinyl-tetradecene-8-dicarboxylic acid-1,14; the dimethyl ester of dichlorohexadecadiene-6,10 dicarboxylic acid-1,16, and the like.

A tyical new product is a preferred mixture of saturated straight and branched chain di-octadecyl esters of cosane dioic acids.

(I) 

and (II) 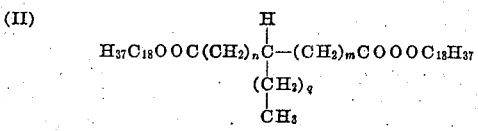

where $n$, $m$, and $q$ are small whole numbers, the sum of which does not exceed 16 and the sum of $n$ and $m$ is at least 2.

Essentially the product is made by the alcoholysis of a mixture of dimethyl esters of mono and poly unsaturated straight and branched chain twenty carbon dibasic acids with octadecyl alcohol to the corresponding mixture of dioctadecyl esters. The esters are subsequently hydrogenated to obtain a wax like material melting at a temperature of more than 70° C. The reverse order of this procedure may be used also. The reverse order is less desirable.

These wax like compounds are found to be compatible as additives to polyethylene and other resinous materials.

As starting materials a mixture of di-methyl esters of the following compounds are typical, thus:

(I) 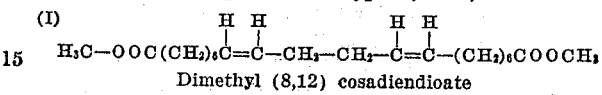

Dimethyl (8,12) cosadiendioate and (II) 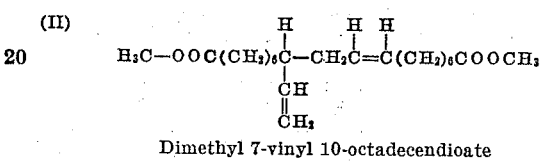

Dimethyl 7-vinyl 10-octadecendioate

Although dimethyl esters are shown, other alcohol starting diesters of mixtures thereof can also be used. These primarily include esters from methyl to propyl, but may be by-product derivatives extending to hexyl.

Example A

This example illustrates the conversion of the dimethyl esters of 8,12 cosadiendioic acid (I) and 7-vinyl 10-octadecendioic acid (II) to the corresponding dioctadecyl esters.

A mixture of about 57% of the unsaturated dibasic acid ester (I) and about 43% of the unsaturated dibasic acid ester (II) in the proportion of 95.9 parts (.262 mole), with 178 parts octadecyl alcohol (.524 mole+25% excess) and a catalyst titanium isopropoxide, in the amount of 2.74 parts (1% of total wt.) are combined in a reactor equipped with an agitator and distillation apparatus.

The mixture is agitated and heated for 1½ hours at 160°–200° C. during which time the theoretical amount of methanol was collected. The excess octadecyl alcohol was distilled off at from 185°–205° C. under 3–5 mm. mercury pressure. The product was filtered while hot, to obtain, in a quantative amount, the solid dioctadecyl derivatives having the following analysis:

Acid number _____ 3.7
Iodine value _____ 55.6
Melting point _____ 58.5°–63.7° C.

Example B

The product of Example A is hydrogenated, as follows: The mixed unsaturated distearyl esters are placed in a low pressure hydrogenation apparatus with .25% by weight catalyst, 5% palladium on carbon powder. The hydrogen pressure was set at 50 p. s. i. and the mixture heated to 175° F. for a 3 hour hydrogenation period. The pressure drop was in the order of 10.3 p. s. i. compared to a theoretical pressure drop of 10.5 p. s. i. calculated from the iodine number. The hydrogenated product was then extracted several times with hot benzene and the palladium and carbon filtered off. This hydrogenated product was a very hard tan wax with the following constants:

Acid number _____ 0.8
Iodine number _____ 1.75
Melting point _____ 70.5°–72.2° C.

Example C

Comparison of the product of Example B with carnauba wax.

Mineral spirits (kauri-butanol value of 35) solutions of the same concentrations of carnauba wax (north country) and the wax of Example B were prepared by gentle heating until the waxes dissolved. Upon cooling, in a draft free area, it was observed that the first particles of synthetic and carnauba waxes appeared at about 65° C. and 45° C., respectively.

The product of Example B may be utilized alone as a wax or otherwise is compatible in a 50/50 ratio with carnauba wax, polyethylene, microcrystalline wax, or synthetic resins as "Arochem 462" a phenolic resin product of Archer-Daniels-Midland Co.

In carnauba wax, the prepared mixture of the diesters as an additive serves to give more body to a spread solution of the wax at higher temperatures. The mixtures are prepared in mutual solvents or may be warmed and mixed by conventional means.

In the above process the mixture of components I and II are illustrative of the herein designated compounds which may be used in the proportionate amounts indicated and similarly processed. The reactants are preferably compounded in mixed relationship in the approximate range and order indicated. This range is preferably in the approximate ratios of about 50% to about 60% of component I to about 50% to about 40% of component II. However, if desired the mixtures can be compounded in other desired proportions for obtaining different and varying results.

The alcoholysis catalyst is preferably titanium isopropoxide and may be one of the titanium short chain alkoxide homologues. Otherwise, less preferably zirconium alkoxide and the oxides, hydroxides and acetates of lead and zinc or of the metals of groups I and II of the periodic table may be utilized in catalytic amounts of .05% to .2% based on the weight of the reactants over and above that equivalent to the ester acidity. The temperature of reaction is specific to the type of catalyst as is known to the art.

From the examples illustrated above, it will be recognized that mixtures of esters, i. e. from the dimethyl esters to dihexyl esters, of mixed straight and branched chain unsaturated aliphatic dibasic acids, as described, may be catalytically converted to other esters such as the corresponding dioctadecyl ester of the corresponding saturated dibasic acids. Other esters and mixtures of esters referred to are intended to include products derived from technical grades of dodecyl, tetradecyl, hexadecyl, and docosanyl alcohols or mixtures of these alcohols. These can be chosen from the family of alcohols, marketed as "Adols"[1] derived from long chain fatty acids, from octanoic through behenic, by hydrogenation of soybean oil, rape oil, cotton seed oil, peanut oil, safflower oil, coconut oil, tallow, fish oils and the like. Such alcohols used to esterify the dibasic acids, as defined, may be mixed alcohols derived from such oils and provide liquid to solid waxy mixtures as diesters in homogeneous non-polymeric forms with each diester chain having at least between 6 to 20 carbon atoms between the carboxyl groups. In addition, straight and branch chain aliphatic alcohols of 8 carbon atoms or more derived from an oxo process such as octyl, decyl, and tridecyl alcohols can be utilized in the present process.

The mixture of substituted and hydrogenated components are prepared by the preferred process, as described, and in the preferred ratios of at least two mixed diesters, alcohol and catalyst, as indicated. The preferred products are homogeneous di-ester mixtures having from 8 to 22 carbon atoms, in the saturated acid radicals of which 1 to 8 carbon atoms can be in a branched chain of one component, and from 8 to 22 carbon atoms in the alcohol radicals.

[1] Archer-Daniels-Midland Company.

The physical properties of the final products can be varied by changing the order of reaction illustrated by Examples A and B. If the short chain dialkyl esters are hydrogenated first and then alcoholized with unsaturated alcohols such as 9 octadecene-1-ol, 9-11 and/or 9-12 octadecadiene-1-ol, and 9-11-13 and/or 9-13-15 octadecatriene-1-ol or mixtures of these alcohols, technical examples of which are "Unadols 40 and 90,"[2] softer products result.

The products are soft semi-solids at room temperatures and compatible with each other, other and similar hard waxes, polyethylene, phenol and other resins, as plasticizers or viscosity modifiers therefor. The synthetic waxes, as described above, are used in paste waxes in any proportion.

In accordance with the patent statutes we have described our invention and improvement in synthetic mixed dibasic ester wax material and while we have endeavored to set forth an illustration thereof in the preferred embodiment, we desire to have it understood that changes may be made within the scope of the claims without departing from the spirit of our invention and improvement in waxy material, as described.

We claim:

1. A hydrogenated product consisting essentially of a mixture of about 50% to about 60% saturated straight chain aliphatic di-ester having the empirical structure:

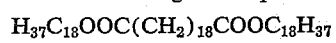

and about 50% to about 40% branch chain aliphatic di-ester having the empirical structure:

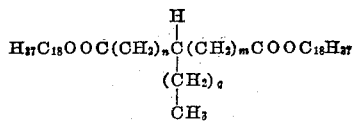

where $n$, $m$, and $q$ are small whole numbers the sum of which does not exceed 16 and the sum of $n$ and $m$ is at least 2.

2. A synthetic polyester material compounded of aliphatic polyesters consisting essentially of a mixture of about 50% to about 60% straight chain and about 50% to about 40%, and branched chain aliphatic dibasic acid diesters hydrogenated to an iodine value of about 1.75, said straight and branched chain acid radicals each containing from 8 to 22 carbon atoms with said branch chain component having from 1 to 8 carbon atoms in a branch chain, and from 8 to 22 carbon atoms in the alcohol radical.

3. A polyester wax material consisting essentially of a mixture of aliphatic hydrogenated straight and branched chain polyesters in a relative ratio of about 50% to 60% and about 50% to 40%, respectively, and characterized as:

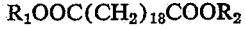

and

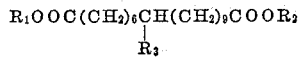

where $R_1$ and $R_2$ are alcohol radicals containing from 8 to 22 carbon atoms and $R_3$ is an alkyl group containing 1 to 8 carbon atoms.

4. A synthetic waxy material consisting essentially of the alcoholysis product of the dimethyl esters of a mixture of substantially completely hydrogenated straight and branched chain dibasic acids in a relative ratio of about 50% to about 60% and about 50% to about 40%, respectively, and each containing a total of 20 carbon atoms in the acid radicals, of which 1 to 8 carbon atoms are in the branched chain with aliphatic alcohols selected from the group consisting of the homologous alcohols of octyl to behenyl.

5. A polyester product consisting essentially of the di-

[2] See footnote 1.

octadecyl esters of straight and branched chain cosane dioic acids having the general structures:

$$H_{37}C_{18}OOC(CH_2)_{18}COOC_{18}H_{37}$$

and $$H_{37}C_{18}OOC(CH_2)_6\underset{\underset{CH_3}{\overset{|}{CH_2}}}{\overset{H}{\overset{|}{C}}}-(CH_2)_9COOC_{18}H_{37}$$

in the ratio of about 50% to about 60% and about 50% to about 40%, respectively.

6. A solid waxy composition of dioctadecyl esters consisting essentially of a mixture of the distearyl esters of 8,12 cosadiendioic acid and 7-vinyl 10 octadecendioic acid in a relative ratio of about 50% to about 60% and about 50% to about 40%, respectively.

7. A waxy composition consisting essentially of straight and branched chain cosane dioic acid esters of alcohols with the alcohol radicals selected from the group consisting of the homologous series of octyl to behenyl, said straight and branched chain esters being in a relative ratio of about 50% to about 60% and about 50% to about 40%, respectively.

8. A polyester composition consisting essentially of diesters of straight and branched chain aliphatic acids, derived by hydrogenation of the corresponding diene acids, having the structures:

$$R_3OOCXCOOR_2$$

and $$R_1OOCYCOOR_4$$

where X and Y are substantially completely hydrogenated in a ratio of about 50% to about 60% and about 50% to about 40%, respectively, and straight and branched chain aliphatic groups with a total of from 6 to 20 carbon atoms of which 1 to 8 in Y are in the branched group, and $R_1$, $R_2$, $R_3$, and $R_4$ are alcohol radicals selected from the group consisting of cyclic, straight and branched chain aliphatic alcohols.

References Cited in the file of this patent

UNITED STATES PATENTS 2,729,665    Buckmann _____ Jan. 3, 1956